Oct. 27, 1953 — F. W. KRUEGER — 2,656,963
FILLING MACHINE
Filed Sept. 16, 1947 — 6 Sheets-Sheet 1

FIG. 1

INVENTOR
FRANK W. KRUEGER
BY Philip G. Minnis
Hans G. Hoffmeister
ATTORNEYS

Oct. 27, 1953     F. W. KRUEGER     2,656,963
FILLING MACHINE

Filed Sept. 16, 1947     6 Sheets-Sheet 2

INVENTOR
FRANK W. KRUEGER

BY *Philip A. Minnis*
*Hans G. Hoffmeister*
ATTORNEYS Oct. 27, 1953  F. W. KRUEGER  2,656,963
FILLING MACHINE
Filed Sept. 16, 1947  6 Sheets-Sheet 6

INVENTOR
FRANK W. KRUEGER
BY Philip A. Minnis
Hans G. Hoffmeister
ATTORNEYS

Patented Oct. 27, 1953

2,656,963

UNITED STATES PATENT OFFICE 2,656,963

FILLING MACHINE

Frank W. Krueger, San Jose, Calif., assignor to Food Machinery and Chemical Corporation, San Jose, Calif., a corporation of Delaware Application September 16, 1947, Serial No. 774,213

15 Claims. (Cl. 226—71)

This invention relates to valves of the type used for filling containers, such as cans or glass jars with liquid and is particularly concerned with improvements in displacement apparatus for filling valves employed in the canning industry.

In commercial canning, containers are usually supplied with a predetermined quantity of solid matter and then are presented to a filling valve for receiving liquid which may be water, syrup, brine or juice, in some instances the containers being filled with fruit juice alone. Thereafter the containers are sealed and passed through a processing apparatus for cooking or sterilizing the contents of the container. For purposes of safety it is necessary that each container be provided with an air space adequate to compensate for expansion of its contents due to the high temperatures to which the containers are subjected during cooking and sterilization. Consequently, it has been found most practical to preoccupy a portion of the interior of each container during the filling thereof so as to displace a portion of the liquid in the container and thereby allow for a head space above the level of the liquid in the same.

While the provision for a head space is imperative, it is equally important that each container be filled to its maximum capacity and that the head space be no greater than necessary to safely treat the contents of the container. Since the available space in any particular container is a known factor, and the amount of air space required for safety purposes during treatment of the contents of such container can be determined, the size of body necessary to displace an amount of liquid sufficient to provide such an air space can also be determined. Consequently it is the practice to provide a displacement mechanism associated with the filling valve for preoccupying a predetermined proportion of the space within the container during the filling operation.

Although prior known filling valves have been provided with a device for satisfactorily accomplishing the foregoing purposes it has been found that in the canning of solid matter, the displacement member is itself displaced due to engagement with the solid matter, or in the case of canning very soft fruit such as apricots, berries and peaches, there is a tendency for the liquid displacement member to crush the fruit and in some cases close off the spaces between the pieces of fruit in the container.

It is one object of the present invention to provide a displacement device for obtaining a proper head space in containers during filling thereof with an equal assurance that each container will be filled with liquid to the desired filling level prior to sealing of the container.

Another object is to provide filling valves with a displacement device for occupying a predetermined and proportioned amount of the space available in a container to thereby displace a predetermined amount of liquid during filling thereof.

Another object is to provide an expansible displacement device for yieldingly engaging solid matter in a container during filling thereof.

Another object is to provide a filling valve with a pliant displacement pad adapted to conform to the shape of solid matter engaged thereby and adapted to expand laterally compensatory to its pressure against the solid matter to assure a proper displacement of liquid in the container during filling thereof.

Another object is to provide a filling valve with a liquid displacement device which is normally retracted during presentation of a container to the valve and expansible into the container for displacing liquid in the same.

Another object is to provide a collapsible displacement device which due to collapsing thereof is retractible from within the confines of the container.

Another object is to provide, in connection with container filling machines, a displacement device which is collapsible after displacement of liquid relative to the container for allowing a proper head space above the liquid level therein.

Other objects and advantages will become apparent from the following description in connection with the drawings in which.

For purposes of illustration, the present invention is associated with a filling machine of the conventional type substantially as shown and described in copending application Serial No. 774,214 filed September 16, 1947, in which I am the joint applicant with William de Back.

In general, the filling machine (Figs. 1 and 2) comprises a frame 1, a movable turret 2, a drive mechanism 3, a feed mechanism 4, and a discharge mechanism 5.

Figure 1:
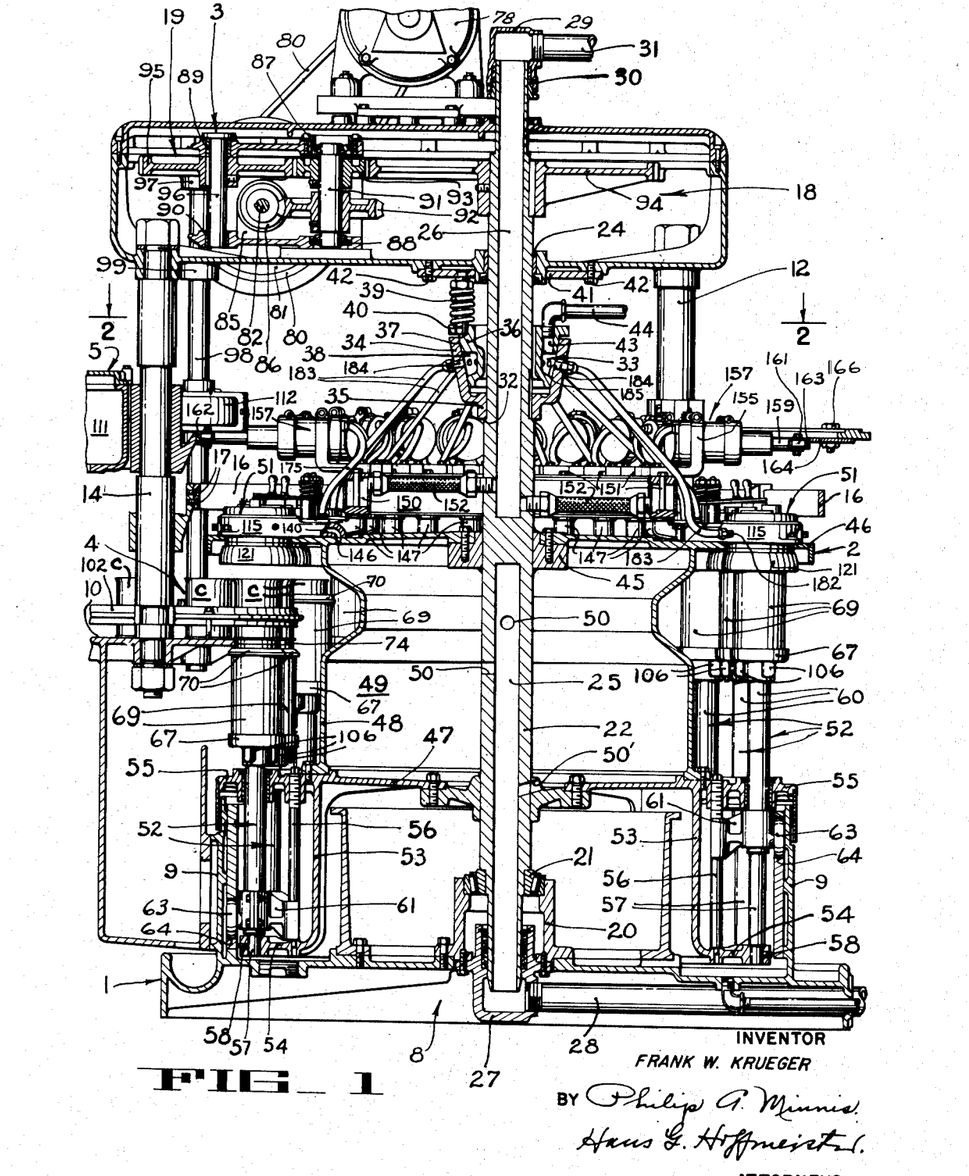
Fig. 1 is a vertical section through a filling machine embodying the present invention.

The frame 1 comprises a base 8 provided with an upstanding annular wall 9 and a platform 10 which may be formed integrally with or secured to one side of the base to provide a support for both the feed and the discharge mechanism 4 and 5, respectively. Extending upwardly in the frame 1 are three equally spaced legs 12, 13 and 14, seen also in Fig. 2. The legs 12 and 13, being similar to each other, are supported by brackets 15 attached to the upstanding wall 9, whereas the leg 14, which is shorter than the others, is supported by the platform 10. These three legs are braced between their ends by an annular strap 16 secured to each of the legs by machine screws 17. Secured to the upper end of each leg 12, 13 and 14 is a gear housing 18 enclosing a power transmission unit 19 forming a part of the above mentioned drive mechanism 3.

The base 8 is provided with a pedestal 20 in which a thrust bearing 21 is seated. Supported on the bearing 21 is the lower end of a tubular shaft 22, the upper portion of which is rotatably supported by a bearing 24 provided in the lower wall of the housing 18.

The tubular shaft 22 is blocked between its ends to provide a lower and an upper conduit 25 and 26, respectively. The lower conduit 25 extends through the base 8 into an elbow 27. The connection between the conduit 25 and elbow 27 is air tight and is such as to permit rotation of shaft 22 relative to the elbow which is secured to the base and connected to a pipe 28 communicating with a vacuum pump, not shown. The upper conduit 26 extends through the housing 18 and into a liquid tight elbow 29 and is secured thereto by a suitable packing nut 30 so as to permit rotation of the shaft 22 relative to the elbow. The elbow 29 is connected to a fluid supply pipe 31 associated with a source of liquid whence water, syrup, or juice is fed into the filling machine.

Figure 2:
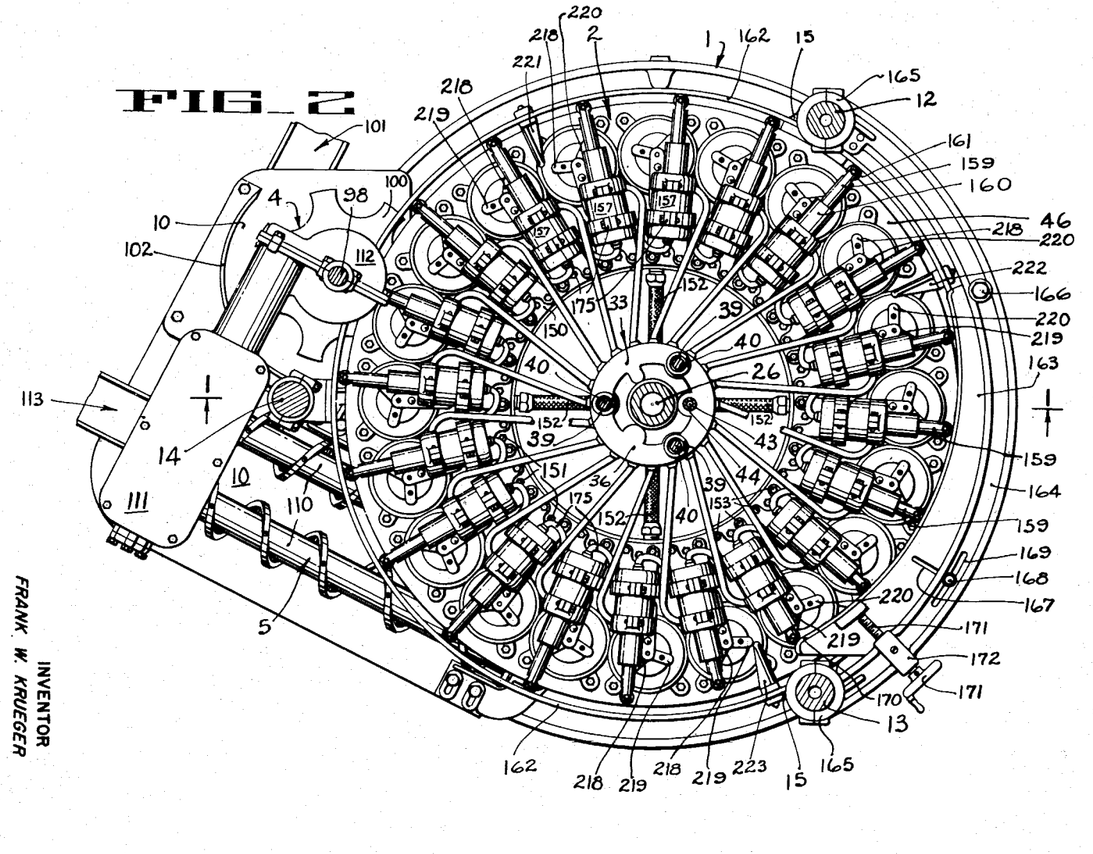
Fig. 2 is a horizontal section through the machine of Fig. 1 taken substantially along line 2—2 thereof.

Substantially midway its ends the shaft 22 is provided with a shoulder 32 for supporting a distributing chamber 33. The distributing chamber 33 comprises a cup shaped housing 34 of frusto conical form having a boss formation 35 at its lower end seated upon the shoulder 32 and keyed to the shaft 22 for rotation therewith. Disposed within the housing 34 is a ring casting 36 having a beveled outer surface 37 provided with an annular recess 38. The beveled surface 37 of the ring casting rests against the internal wall of the cup shaped casting 34 and is pressed into sealing engagement therewith by a plurality of compression springs 39 (Figs. 1 and 2). Each spring 39 surrounds a stud pin 40 having its upper end secured to a disc 41 in turn secured to the lower wall of the housing 18 by bolts 42. The upper wall of the ring casting 36 is provided with a tapped opening 43 in which a pipe 44 is threadedly supported and this pipe 44 is connected to a source of fluid, not shown, such as water. The water is supplied by way of the pipe 44 to the distributing chamber 33 for ready distribution to the filling valves of the machine in a manner later to be explained.

The tubular shaft 22 is provided with an annular flange 45 to which the turret 2 is secured for rotation therewith. The turret 2 comprises upper and lower discs 46 and 47, respectively, spaced from each other by a web 48 to provide an air tight chamber 49 in conjunction therewith around the lower conduit 25 of the tubular shaft 22. The conduit 25 has several ports 50 exposed to the interior of the chamber 49 for vacuumizing the same, the lowermost port 50′ providing a drain for clearing the chamber of drainage. Vacuumization of the chamber provides a reservoir of vacuum for use in connection with the filling of containers. A plurality of filling valves 51 are supported in annular array on the upper disc 46 and a can lift 52 is supported in axial alignment with and below each valve by the lower disc 47. The lower disc 47 includes a depending annular bracket 53 provided with a lateral flange 54 disposed parallel to the upper outer extremity 55 of the disc 47 for supporting the can lifts 52 in annular arrangement adjacent the periphery of the turret 2.

Each lift 52 (Figs. 3 and 4) comprises a pair of guide rods 56 and 57 disposed parallel the shaft 22 and in spaced relation along a line extending radially of the same. The lower end of the guide rod 56 is secured to the flange 54 and its upper end is secured to the outer extremity 55 of the disc 47. The guide rod 57 is secured to the lower flange portion 54 of the disc 47 by a set screw 58 and extends upwardly through a bore 59 provided in the outer extremity 55 of the disc 47.

Figures 3, 4:
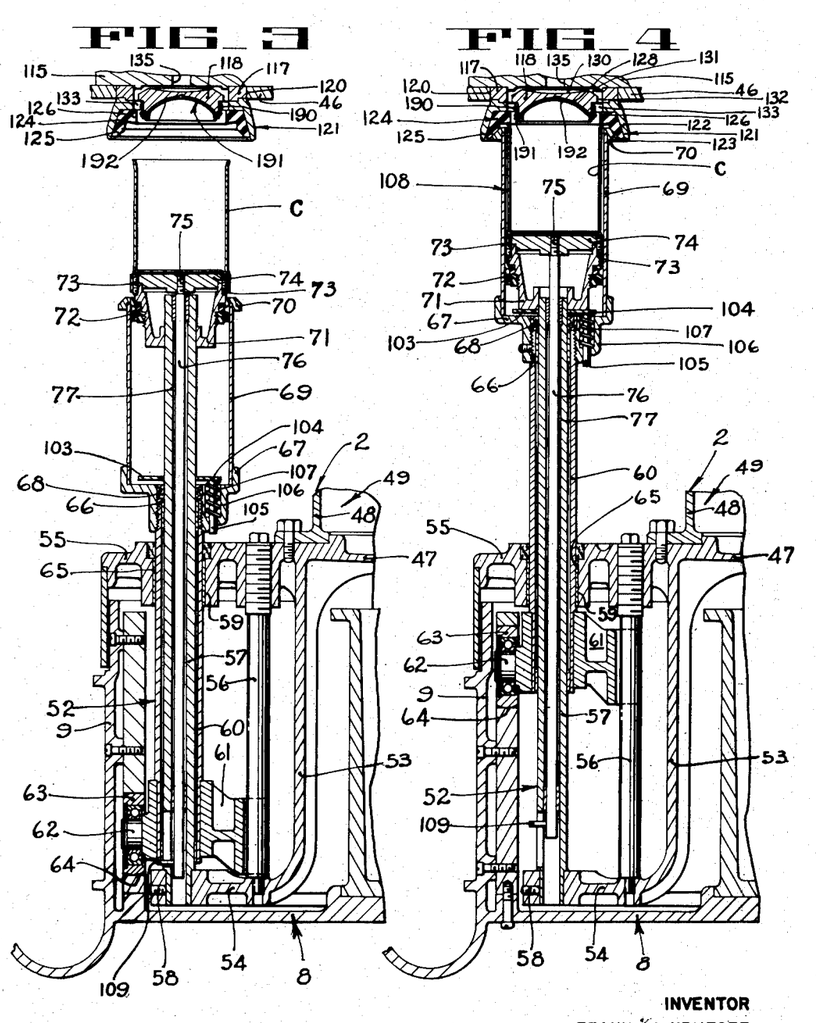
Fig. 3 is a vertical section through a container lift of the filling machine.
Fig. 4 is a section similar to that of Fig. 3 showing portions thereof in a different position.

Slidably mounted on the guide rod 57 is a sleeve 60 having secured to its lower end a yoke casting 61 carrying a lateral stud 62 upon which a ball bearing roller 63 is mounted for rolling movement within a cam track 64. The cam track 64 is supported by the upstanding wall 9 of the base 8, concentrically with respect to the axis of rotation of the tubular shaft 22. The yoke portion of the casting 61 straddles the guide rod 56 to prevent turning of the sleeve 60 as the roller 63 travels along the cam track 64.

The sleeve 60 and guide rod 57 telescope relative to each other and the upper portion of the sleeve is guided for sliding movement in a bushing 65 provided in the bore 59. The upper end 66 of the sleeve 60 extends above the disc 47 and has a cup shaped flange 67 threadedly secured thereto, the connection between the cup and sleeve being provided with suitable packing 68 to provide an air tight seal therebetween.

Welded or otherwise connected to the cup shaped flange 67, so as to extend upwardly therefrom, is a cylindrical shell 69 provided at its upper end with a conical rim 70 for reasons later to be made apparent. The guide rod 57 extends into the cylindrical shell 69 and has a piston structure 71 slidably arranged thereon and provided with a sealing ring 72 which engages the inner wall of the shell 69.

Secured to the upper end of the piston 71 by machine screws 73 is a can table 74 which is threadedly connected to the reduced upper end 75 of a rod 76 disposed for sliding movement in an axial bore 77 provided in the rod 57. Each can table 74 is normally disposed in its lowermost position, i. e., at the same level as the upper surface of the platform 10 (Fig. 1) to receive containers from the feed mechanism 4.

Mounted on the upper wall of the housing 18 of the drive mechanism 3 is a motor 78 (Fig. 1) having a multiple drive pulley, not shown, drivingly connected by belts 80, to a multiple pulley 81 keyed to one end of a drive shaft 82 extending from the housing 18. The drive shaft 82 is suitably supported for rotation within the housing 18 by spaced bosses formed on a bracket 85 secured to the lower wall of the housing, and the shaft 82 has a worm gear 86 keyed thereto for rotation therewith.

The bracket 85 (Fig. 1) is provided with a pair of vertically aligned bearings 87 and 88 adjacent one side of the shaft 82 and a pair of vertically aligned bearings 89 and 90 adjacent the other side of the same. The bearings 87 and 88 support a stub shaft 91 having a worm wheel 92 keyed thereto drivingly engaging the worm gear 86 on the drive shaft 82. Also keyed to the stub shaft 91 is a spur gear 93 which meshes with a gear 94 keyed to the tubular shaft 22 for rotating the latter and turret 2 within the frame. The spur gear 93 also meshes with a gear 95 keyed to a shaft 96 supported parallel to the stub shaft 91 by the bearings 89 and 90 of the bracket 85.

The gear 95 meshes with a gear 97 keyed to a shaft 98 providing an auxiliary drive for the feed and the discharge mechanisms 4 and 5. This auxiliary drive shaft 98 (Figs. 1 and 2) is suitably supported for rotation by a bearing 99 provided in the lower wall of the housing 18 and a thrust bearing (not shown) provided in the platform 10.

Secured to the shaft 98 adjacent the platform is a star wheel 100 (Fig. 2) for receiving containers fed onto the platform from an inlet chute 101. The containers are moved by the star wheel 100 along an arcuate path adjacent a guide rail 102 supported by the short leg 14 of the frame. The star wheel 100 transfers the containers from the platform 10, individually, onto successive can tables 74, as the latter move one after another into registration with the containers nested between the points of the star wheel. The end of the guide rail 102 is so located as to release each container as it is properly positioned on a can table 74 so that the latter removes the container from the star wheel 100.

Figure 5:
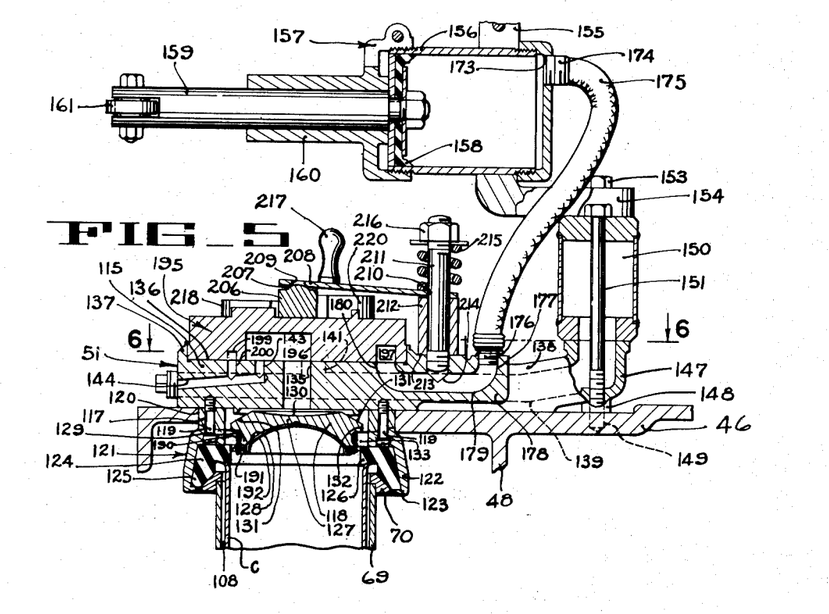
Fig. 5 is a vertical section through one of the filling valve units shown in Figs. 1 and 2 embodying the present invention.

After each can table 74 has received a container, the roller 63 of the lift mechanism 52 associated therewith climbs an acclivity on the cam track 64. The sleeve 60 associated with the roller 63 rises therewith elevating the cylindrical shell 69 relative to the can table and container until the piston structure 71 is engaged by a pedestal 103 within the cylindrical shell 69 (Figs. 4 and 5).

The pedestal 103 comprises a ring 104 encircling the guide rod 57, and pins 105 extending downwardly from the ring for sliding movement in boss formations 106 on the cup shaped flange 67. Each pin 105 is encircled by a compression spring 107 seated in the respective boss formations 106 and bearing against the underside of the ring 104 to maintain the latter in spaced relation with respect to the floor of the flange 67. The springs 107 are of sufficient strength to maintain the ring 104 spaced from the flange 67 when the ring supports the piston structure, can table, and container and, consequently, the container will extend slightly above the conical rim 70 of the shell 69. However, when the open upper rim of the container sealingly engages the filling valve unit 51 thereabove, the springs 107 will yield allowing the cup shaped flange and cylindrical shell to rise with respect to the container until the conical rim 70 sealingly engages the filling valve unit 51. Upon sealing engagement of the rim 70 with the filling valve, the container will be completely enclosed within a jacket 108 provided by the cup shaped flange, cylindrical shell, and filling valve unit. In this condition, the containers are conveyed through a circuitous path by the turret 2 as it rotates within the frame 1.

At the opposite end of the circuitous path, the roller 63 of each lift 52 descends a declivity in the cam track 64, a pin 109 extending laterally from the lower end of the rod 76 is engaged by the yoke casting 61 and the can table 74 is lowered. The can tables are thus lowered one after another so that the containers carried thereby successively enter the mouth of the discharge mechanism 5. The discharge mechanism 5 is of a conventional construction comprising spaced twin screws 110 suitably supported above the platform 10 and extending over the turret 2 to receive the containers from the can tables 74.

These screws 110 are drivingly associated with power transmission gears, not shown, within a housing 111 having a power take-off unit 112 operatively connected to the auxiliary drive shaft 98 (Figs. 1 and 2) in a manner well known in the art. The twin screws rotate upwardly and outwardly with respect to each other and have opposing convolutions calculated to accelerate transfer of a container from a can table 74 onto the platform 10 while the can table continues moving in its circuitous path away from the container. The screws 110 convey the containers across the platform 10 and subsequently discharge the containers one after another into an outlet chute 113.

Each filling valve 51 (Figs. 5 to 12, inclusive) comprises a body 115 secured to the disc 46 by bolts 116. The outer annular portion 117 of a plate 118 is secured to the body 115 by cap screws 119 and the plate 118 extends downwardly into an opening 120 provided in the disc 46. The screws 119 also serve to secure a sealing cap 121 to the annular portion 117 of the plate 118 so that the cap 121 is disposed below the disc 46 in vertical alignment with and above a respective lift mechanism 52.

Each sealing cap 121 has a skirting or annular wall 122 provided with an inwardly extending lip 123. The inner wall of the cap 121 (Fig. 5) is lined with a rubber sealing ring 124 having a depending periphery 125 retained within the cap 121 by the annular lip 123 and having an inwardly extending annular portion 126 adapted to sealingly engage the open upper end of a container presented thereto by the lift mechanism.

The plate 118 (Figs. 5, 11 and 12) has an integral central portion 127, the lower face of which is provided with a dome shaped concavity 128 surrounded by a depending circular rim 129. The upper face of the central portion 127 is provided with a slight concavity 130 terminating in quadrantal beveled edges 131 and slots 132 (Fig. 12) each connected to a passage 133 provided by the annular opening between the circular rim 129 and the sealing cap 121 and sealing ring 124.

Figure 11:
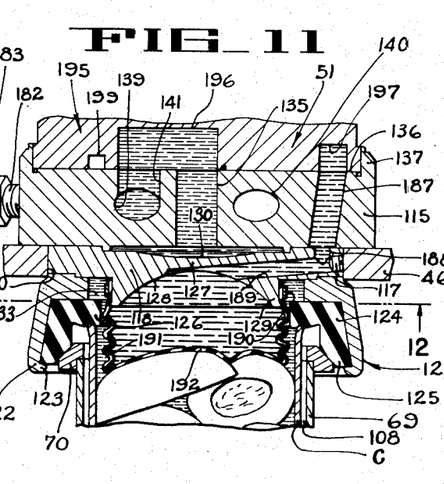
Fig. 11 is a section through the filling valve taken along line 11—11 in Fig. 8.
Figure 12:
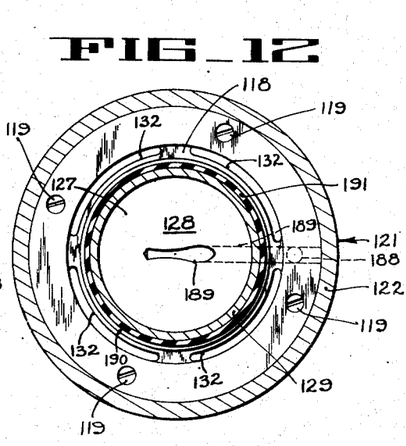
Fig. 12 is a section looking upwardly along line 12—12 in Fig. 11.

The body 115 is provided with a central bore 135, extending upwardly from the concavity 130 into communication with the upper surface of the body. The upper surface of the body 115 is provided with a depressed portion 136 surrounded by an upstanding annular wall 137 (Figs. 5 and 11). A portion 138 of the body 115 extends radially therefrom (Figs. 5 and 6) i. e., inwardly with respect to the turret 2, and is provided with parallel passages 139 and 140 extending through the body and spaced from each other and from the central bore 135 which is disposed between them. The passage 139 communicates with the depressed upper portion 136 of the body by way of a vertical bore 141 in the body and the passage 140 communicates with the depressed portion 136 by way of a vertical bore 142 in the body 115.

The centers of the two vertical bores 141, 142 are equally spaced from the central bore 135 and are disposed 120° from each other relative to the center of the bore 135 for reasons which will become apparent hereinafter. The body 115 is also provided with a venting bore 143 (Figs. 5 to 8, inclusive) which is spaced from the central bore 135 a radial distance equal to the spacing of the bores 141, 142 therefrom. The bore 143 is disposed 120° from either of the bores 141, 142 and is connected to a passage 144 (Fig. 5) communicating with atmosphere at one side of the body 115.

Figures 13, 14:
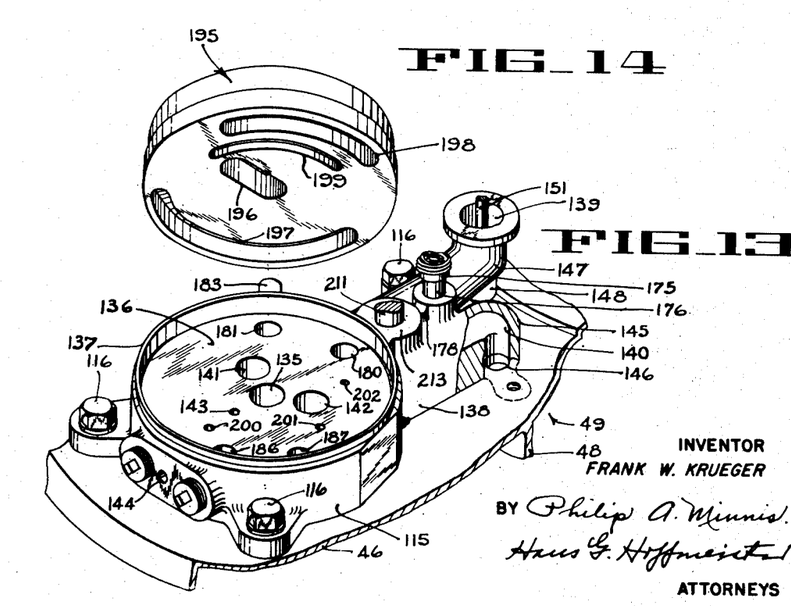
Fig. 13 is a perspective view of the body only of the filling valve unit shown in Fig. 5.
Fig. 14 is a perspective view of the valve member of the filling unit removed from the filling valve body shown in Fig. 13.

The passage 140 (Fig. 13) extends through a downturned elbow 145 in alignment with an opening 146 provided in the disc 46 to communicate the passage 140 with the vacuum chamber 49. The passage 139 is inclined slightly to communicate with an upturned elbow 147 provided with a bored foot 148 resting upon the disc 46 in alignment with a tapped opening 149 in the disc. The elbows 147 of the several filling valves are arranged in a circle on the turret to support an annular conduit 150 secured to each elbow by a long bolt 151. The bolts 151 each extend from the top of the conduit 150 down through the bore in the respective foot 148 and are each threadedly connected to the tapped opening 149 in alignment therewith. The conduit 150 is uniformly supplied with liquid, such as syrup through several flexible tubes 152 (Figs. 1 and 2) each having one end communicating with the annular conduit 150 and its opposite end communicating with the upper conduit 26 of the tubular shaft 22.

Secured by bolts 153 to the upper wall of the annular conduit 150, adjacent each filling valve unit 51, is a bracket 154 having a clamping ring 155 formed at its upper end for holding the cylinder 156 of a pump 157 with its axis disposed radially with respect to the turret 2.

The pump 157 is provided with a piston 158 secured to one end of a rod 159 slidably mounted in a sleeve 160 provided in one end wall of the pump. The opposite end of the rod 159 carries a roller 161 which engages a cam strap 162 concentrically disposed with respect to the turret 2. The ends of the cam strap 162 are secured to the legs 12 and 13, respectively, and the midportion of the cam strap is connected to the leg 14 for limiting movement of the rods and pistons outwardly relative to the respective pumps.

Between the legs 12 and 13, in alignment with the cam strap 162, is an arcuate cam 163 (Figs. 1 and 2) supported by a bowed beam 164 spanning from the leg 12 to the leg 13 and secured thereto by suitable clamping brackets 165. One end of the arcuate cam 163 is pivotally mounted on the beam 164 by a bolt 166 adjacent the end of the cam strap 162. The opposite end of the arcuate cam 163 (Fig. 2) is provided with a slot 167 through which a bolt 168 is extended and guided for sliding movement within a slot 169 formed in the beam 164. The free end 170 of the arcuate cam terminates adjacent the leg 13 and is adapted to be adjusted toward and away from the axis of the turret 2 by a hand operated screw 171 threadedly supported in a boss formation 172 provided on the beam 164.

The end wall of the pump 157 (Fig. 5) opposite the sleeved end thereof is provided with an opening 173 into which is threaded a nipple 174 having one end of a hose 175 secured thereto. The opposite end of the hose 175 is connected to a nipple 176 threaded into an opening 177 in a web 178 provided on the extended portion 138 of the body 115. The opening 177 forms one end of a passage 179 provided in the web and body and terminating in an opening 180 provided in the depressed portion 136 a slight distance inwardly from the upstanding wall 137 of the body. The body 115 is likewise provided with an elbowed port 181 a slight distance inwardly from the annular wall 137. The port 181 is provided with a nipple 182 to which one end of a tube 183 is secured. The opposite end of the tube 183 is connected to a nipple 184 (Fig. 1) threaded into a tapped opening 185 provided in the cup shaped housing 34 in communication with the recess 38 of the distributing chamber 33, hereinbefore referred to, for conveying water from the chamber to the filling valve unit 51.

The body 115 is further provided with bores 186 and 187 (Figs. 6, 7, 8 and 13) each spaced the same distance from the wall 137 as is the port 181 and the opening 180. The bore 186 communicates with the passage 140 leading to the vacuum chamber 49. The bore 187 (Figs. 11 and 12) extends downwardly at an angle from the depressed portion 136 to the bottom of the body 115 and communicates with a vertical bore 188 in the annular portion 117 of the plate 118. The bore 188 is connected to a lateral bore 189 extending into the dome shaped concavity 128 of the central portion 127 of the plate 118.

Secured to the circular rim 129, hereinbefore referred to, by a suitable clamping ring 190, is the open upper end of an elastic bag or bellows 191 for closing off communication between the container and the bore 189. The side walls of the bellows 191 are creased or pleated so as to fold together automatically when collapsed and retracted in the manner shown in Fig. 5. The lower end of the bellows 191 (Fig. 11) provides a diaphragm 192 adapted to engage fruit in the container when the bellows is expanded.

A valve member 195 (Fig. 14) is disposed in the depressed portion 136 of the body 115 for rotation relative thereto and the lower face of this valve member is provided with a main recess 196 which extends radially from the axis about which the valve member is to rotate. The lower face of the valve member 195 is further provided with an arcuate recess 197 spanning an angle of 120° relative to the axis of rotation of the valve member and a shorter arcuate recess 198 disposed substantially diametrically opposite the recess 197.

The recesses 197 and 198 are disposed in the same circumferential relationship with respect to the axis of rotation of the valve member 195 and are adapted to register with the aforementioned opening 180, port 181, and bores 186, 187 in the body 115. The valve member 195 is also provided with a narrower arcuate recess 199 substantially midway between the arcuate recess 198 and the outer radial extremity of the main recess 196.

The main recess 196 is in constant communication with the central bore 135 and is adapted to register with either the bore 141, 142 or 143 when the valve member 195 is at rest in any one of its three principal positions of adjustment, explained hereinafter. The narrower arcuate recess 199 is adapted to register with ports 200, 201, and 202 provided in the depressed portion 136 of the body 115. The recess 199 extends circumferentially with respect to the axis of rotation of the valve member 195 for intercommunicating either the port 200 or 202 with the port 201 during a certain phase of the rotation of the valve member with respect to the body 115.

The port 200 is connected to the aforementioned passage 144 (Fig. 5) for communicating the recess 199 with the atmosphere. The port 202 is connected to the passage 140 for communicating the recess 199 with the vacuum chamber 49. The port 201 (Figs. 9, 10 and 13) is connected to a passage 203 in turn connected to a passage 204 extending downwardly through the body 115, plate 118, cap 121, and sealing ring 124. In other words, the passages 203—204 are provided for communicating the recess 199 with the jacket 108 provided by the shell 69 when the lift 52 is in raised position (Fig. 4).

The valve member 195 is provided with an upwardly extending hub portion 206 having a ball shaped end 207 which is engaged by a spring urged arm 208. The arm 208 is provided with an aperture 209 which fits over the ball shaped end 207 of the hub 206 and the opposite end of the arm is also provided with an aperture 210 through which the shank of a bolt 211 extends. The bolt 211 extends through a sleeve 212 upon which the arm 208 rests and the sleeve is supported on a boss formation 213 provided in the web 178 of the extended portion 138 of the body 115. The end of the bolt 211 is threaded into a tapped bore 214 in the boss 213. A compression spring 215 surrounds the upper portion of the bolt 211 above the arm 208 and is urged downwardly by a head nut 216 threadedly connected to the upper end of the bolt 211. The arrangement is such that the spring 215 bears down upon the arm 208 to urge the valve member 195 downwardly so as to maintain its lower surface in sealing contact with respect to the depressed upper surface 136 of the body 115. The pressure applied by the compression spring 215 to the arm 208 may be varied or, on occasion, released so that the arm can be swung aside by a handle 217 secured thereto, and the valve taken apart for purposes of cleaning or repairs.

Secured to the valve member 195 and extending radially from the hub portion 206 thereof (Fig. 2) are three teeth 218, 219, and 220 disposed 120° from each other relative to the axis of rotation of the valve member. These three teeth 218, 219, 220 are adapted to be engaged successively by three dogs 221, 222, and 223, respectively, as the valve units 51 move through the aforementioned circuitous path of travel. Each of the dogs 221, 222, 223 are secured to the aforementioned annular strap 162 and extend radially inwardly therefrom (Fig. 2) to engage the respective teeth 218, 219, 220 as the turret 2 is rotated clockwise.

The first dog 221 is positioned just beyond the feed mechanism 4 for engaging the tooth 218, shortly after a container is presented to the filling valve by the lift 52, to turn the valve member 195 120° counterclockwise (Fig. 2) about its axis of rotation. The dog 222 is positioned approximately 90° from the dog 221 relative to the axis of the turret, for engaging the tooth 220 to turn the valve member 195 another 120° step counterclockwise about its axis, and the dog 223 is positioned just forward of the mouth of the discharge mechanism 5 for engaging the tooth 219 to turn the valve member still another 120° step counterclockwise about its axis.

In operation the filling machine is constantly supplied with the desired liquid, either juice, water, syrup or brine, via the supply pipe 31, a vacuum of approximately 28 inches of mercury is established in the vacuum chamber 49, and water, or any other suitable fluid, is supplied to the distributing chamber 33 via the pipe 44. The turret 2, feed and discharge mechanisms 4 and 5, respectively, are then driven in timed relation with respect to each other by the drive mechanism 3 and containers are fed open end up, one after another along the inlet chute 101 into successive pockets provided by the star wheel 100 of the feed mechanism.

It should be understood that the feed mechanism is preferably provided with a "no-can-no fill" device, not shown, associated with the first dog 221 for rendering the same inoperative with respect to the first tooth 218 of the valve member in a manner well known in the art. In this regard, it will be noted that the first tooth 218 is of lesser height than the teeth 219 and 220 and will, therefore, pass beneath either of the dogs 222 or 223 so that operation of a valve unit 51 is entirely eliminated in the event no can is presented thereto by the lift mechanism.

For purposes of clarity, the following description is confined to the progress of a single container C through the filling machine and to the resultant operation of one filling valve mechanism during such operation. The container C is advanced by the star wheel 100 into registration with the can table 74 of one lift 52 after which the container is elevated into the position shown in Fig. 4. In this position the open upper end of the container sealingly engages the portion 126 of the rubber sealing ring 124 and the conical rim 70 of the cylindrical shell 69 engages the inner surface of the depending periphery 125 of the sealing ring 124.

Figure 6:
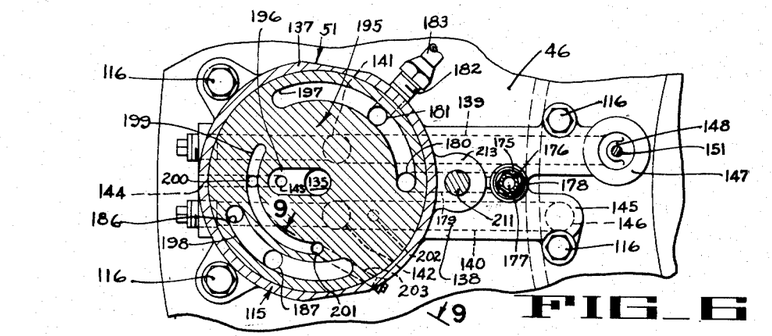
Fig. 6 is a horizontal section through the filling valve shown in Fig. 5 when the same is in neutral or container receiving and/or discharging condition.
Figure 7:
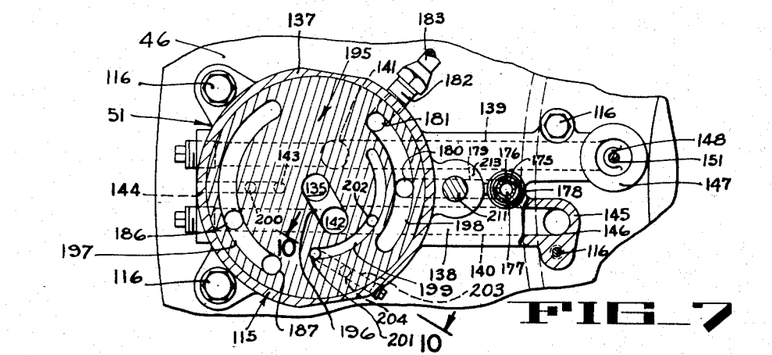
Fig. 7 is a section similar to that of Fig. 6 showing the condition of the filling valve during vacuumization of a container.
Figure 9:
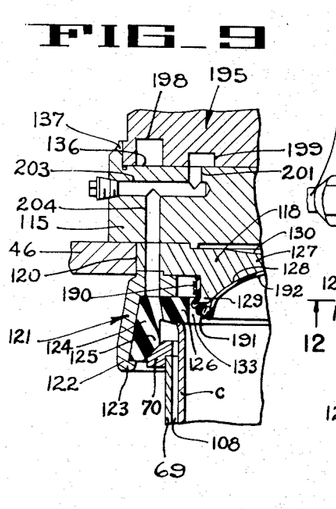
Fig. 9 is a partial section of the filling valve taken along line 9—9 in Fig. 6.
Figure 10:
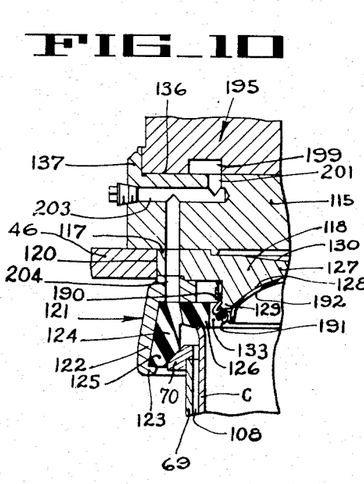
Fig. 10 is a partial section taken along line 10—10 in Fig. 7.

Each filling valve unit 51 is normally in closed or neutral, non-can filling, condition as a container is received by the can table associated therewith and when in this neutral condition, the valve member 195 is in the position shown in Figs. 5 and 6. In this position the main recess 196 of the valve member communicates the venting bore 143 and passage 144 with the interior of the container (Fig. 5) and the narrower arcuate recess 199 communicates the venting port 200 with the port 201, passage 203—204, and jacket 108 (Fig. 9). The short arcuate recess 198 connects the vacuum passage 140 with the bore 187 leading to the bellows 191, and the arcuate recess 197 connects the port 181 leading from the water supply tube 183 to the opening 180 which is in communication with the pump 157.

Consequently, the container and jacket are both connected to atmosphere during and after sealing contact thereof with the sealing cap 121 to thereby relieve any pressure created within the container and jacket during presentation of either of them to the filling valve unit 51. The bellows, being connected to the vacuum passage 140 is deflated into the condition shown in Figs. 3, 4 and 5 due to the atmospheric pressure prevailing exteriorly of the bellows, i. e., within the container C. The arcuate recess 197 (Fig. 6) opens the water supply from the distributing chamber 33 to the pump 157 (Fig. 5) charging the cylinder 156 of the pump with a predetermined volume of water. The piston 158 of the pump is thereby forced into the position shown in Fig. 5 and the roller 161 at the end of the piston rod 159 abuts the cam strap 162 (Fig. 2).

As the turret 2 rotates clockwise in Fig. 2, the first tooth 218 of the valve member 195 engages the first dog 221. Consequently, the valve member 195 is rotated 120° in a counterclockwise direction within the depressed portion 136 of the body 115 of the valve unit 51, i. e., into the position shown in Fig. 7. During rotation of the valve members 195, as stated above, the main recess 196 and the narrower arcuate recess 199 shift out of communication with the venting bores 143 and 200, respectively, and into registration with the vacuum bores 142 and 202, respectively. Consequently, the container and jacket are simultaneously vacuumized. The bellows is again communicated with the vacuum passage so that the vacuum prevailing in the bellows becomes equalized with the vacuum prevailing within the container and jacket, and at the same time the pump is again connected to the water supply.

Figure 8:
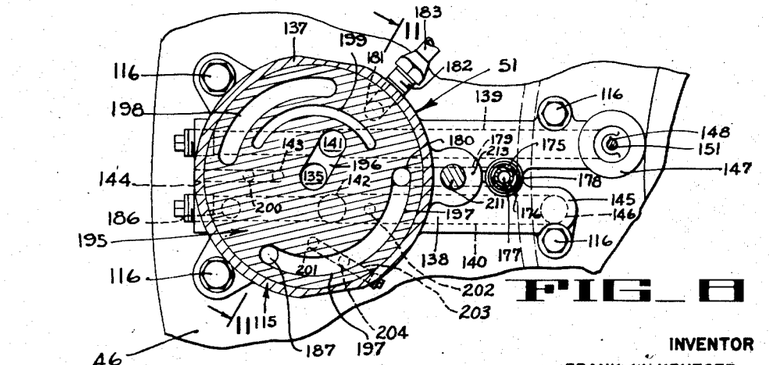
Fig. 8 is a section similar to that of Figs. 6 and 7 showing the condition of the filling valve during filling of a container with liquid.

As the turret continues to move clockwise, (Fig. 2) the dog 222 engages the tooth 220, turning the valve member another 120° step counterclockwise, into the position shown in Fig. 8. The main recess 196 now registers with the bore 141 while the arcuate recess 197 communicates with both the bore 187 and the opening 180. Consequently, the vacuum passage 140 is shut off relative to the jacket, container, and bellows, and liquid is directed from the liquid passage 139 into the pre-vacuumized container while the charge of water isolated in the pump 157 is connected for discharge into the pre-vacuumized bellows.

As soon as liquid begins to flow into the pre-vacuumized container, the roller 161 of the pump unit climbs the arcuate cam 163 and the piston 158 is thereby pressed against the predetermined charge of water in the pump 157 to transfer the water into the bellows. Since the container and bellows were both vacuumized so far as is practicably possible, they each promptly receive a full charge of their respective liquids without the formation of air pockets.

The liquid flows from the liquid passage 139 by way of the bore 141, recess 196, and bore 135 onto the concavity 130 in the upper surface of the plate 118 and spreads over the central portion 127 of the plate eventually spilling over the beveled edges 131 thereof into the quadrantal slots 132 for distribution in a substantially annular stream along the inner wall of the container. As the liquid enters the container, the pump piston 158 is forced inwardly a distance determined by the position of adjustment of the arcuate cam 163 to transfer a measured quantity of water into the bellows, thereby distending the bellows to a predetermined size within the container. The amount of water injected into the bellows is calculated to occupy a predetermined proportion of the volumetric capacity of the container to displace a sufficient quantity of liquid therein and thereby allow for the required head space.

In the event the container has previously been supplied with solid matter, to such an extent that the diaphragm 192 of the bellows engages the topmost articles in the container in the manner illustrated in Fig. 11, the bellows is sufficiently pliant to yield relative to the articles and to expand into the crevices between the fruit as well as laterally within the container. In other words, the body of water in the bellows is under sufficient pressure to expand the bellows, in the manner explained above, so as to displace the same amount of liquid as it would if there were no articles in the container.

In addition to displacing liquid in the container, the bellows also hold the solid matter in a natural position within the container without crushing or bruising the articles therein. In this manner, when the containers are supplied with fruit, the several pieces thereof are not unduly compressed so as to close the interstices between them and consequently the incoming liquid is admitted to all of the spaces not occupied by fruit. Moreover, the expanded bellows is of a size calculated to displace the proper amount of liquid to assure a liquid level above the fruit in the container and to allow for a head space above such liquid level when the container is removed from the filling valve.

After the roller 161 rides off of the end 170 of the cam 163, the liquid within the container and the fluid in the bellows will remain in a static condition until the third dog 223 is engaged by the tooth 219 of the valve member 195.

As the valve unit 51 passes the third dog 223, the valve member 195 is advanced another 120° step thereby completing one whole revolution, counterclockwise, so that the valve member is now 360° from starting position, or again in the neutral condition shown in Fig. 6. In the course of this last 120° step, communication between the pump 157 and bellows is first cut off and subsequent thereto, communication between the container and the liquid supply is cut off. The water supply line is then connected to the pump which is again charged with water, and the vacuum passage is again connected to the bellows to evacuate, collapse and retract the bellows. The water used to fill the bellows if used over and over would become hot and therefore would expand and eventually would boil due to the vacuum prevailing in the containers. Consequently, the water in the bellows is changed and renewed after each filling operation to assure expansion of the bellows only so far as necessary to displace a proper amount of liquid for obtaining the desired head space in each container. Finally the container and jacket are again connected to atmosphere (Figs. 5 and 9) so that as the lift mechanism 52 begins to descend the container is not air-locked relative to the sealing ring and will freely lower with the can table 74.

As the container lowers away from the filling unit 51, the bellows will already have been retracted to the position shown in Fig. 5, thereby allowing the liquid within the container to level off, slightly below the open upper rim of the container. Therefore, as the turret advances the can table 74 into registration with the mouth of the discharge mechanism 5, and the container is transferred into the latter, there is little danger of the liquid spilling from the container.

Each filling valve unit 51 operates in the manner as hereinbefore explained during one cycle of operation of the machine and each operation is repeated successively from cycle to cycle so that there is a continuous filling of containers as they are fed into the filling machine. The containers therefore discharge in a steady stream from the filling machine by way of the discharge chute 113 and are ready for immediate capping.

While the construction and operation of the filling machine and the filling valve embodying the present invention has been specifically described herein, it will be apparent to those skilled in the art that they are susceptible of various modifications and alterations without departing from the spirit of the present invention. I, therefore, desire to avail myself of all variations and modifications which come within the scope of the appended claims.

What I claim as new and desire to protect by Letters Patent is:

1. In a container filling machine, means for providing headspace in containers being filled with liquid comprising a source of vacuum, a source of fluid and a source of filling liquid, a filling valve comprising a container engaging seal, said valve having a plurality of operated conditions expansible means associated with said seal for expansion into a container engaged thereby, said valve having a first position connecting said container and expansible means with the source of vacuum said valve having a second position connecting the container with the source of filling liquid and communicating said expansible means with a source of fluid to thereby expand the expansible means into the container to thereby displace a predetermined portion of said liquid therein, and means for operating said valve from one position thereof to another and subsequently again connecting said source of vacuum with the expansible means for collapsing the latter to thereby provide a head space above the liquid in the container.

2. A filling machine comprising a source of liquid, a source of vacuum, a source of fluid, means for isolating a predetermined quantity of said fluid, a sealing cap adapted to engage a container presented thereto and provided with an expansible member adapted to expand into the container, means cooperating with said sealing cap for providing a jacket around said container, a valve seat associated with said sealing cap having a plurality of ports each communicating respectively with the container, jacket, sources of liquid, fluid, vacuum, and with atmosphere, a valve member rotatably supported in said valve seat and normally positioned with respect to the ports thereof for connecting the container and jacket with atmosphere, the source of fluid with said isolating means, and said source of vacuum with said expansible member, and means for intermittently operating said valve member for connecting the source of vacuum with said container and jacket for simultaneously vacuumizing the same and for subsequently connecting the container with said source of liquid while communicating said isolating means with the expansible member for expanding the latter during influx of liquid into the container.

3. A filling machine comprising a source of liquid, a source of vacuum, a source of fluid, means for isolating a predetermined quantity of fluid, a sealing cap adapted to engage a container presented thereto, an expansible member on said sealing cap adapted to extend into the container and to engage fruit therein, means cooperating with said sealing cap for providing a jacket around said container, a valve seat associated with said sealing cap having a plurality of ports each communicating respectively with the container, jacket, source of liquid, fluid, vacuum, and with atmosphere, a valve member rotatably supported in said valve seat and normally positioned with respect to the ports thereof for connecting the container and jacket with atmosphere, the source of fluid with said isolating means, and said source of vacuum with said expansible member, means for operating said valve member for connecting the source of vacuum with said container and jacket for simultaneously vacuumizing them and then for connecting the container to the source of liquid and the isolating means with the expansible member for expanding the latter into the container, and then for subsequently advancing said valve member to its normal position for shutting off the connection between the container and source of liquid and for collapsing said expansible member while communicating said container and jacket with atmosphere.

4. A container filling arrangement comprising an expansible vessel, means for positioning a container with its open end adapted to receive said vessel, means operable to supply liquid into the container, and means operable coincident with said liquid supply means to deliver fluid into said vessel to expand said vessel into said container and thereby occupy a portion of the volumetric capacity thereof, said expansible vessel being of a nature to separate the fluid therein from the liquid within the container.

5. A container filling arrangement comprising a container engaging seal, an expansible bellows located within the confines of said seal, means for positioning a container with its open end in engagement with said seal in a manner surrounding said bellows, means operable to supply liquid into the container, means operable coincident with said liquid supply means to deliver a predetermined quantity of fluid into said bellows to expand said bellows into said container and thereby occupy a predetermined proportion of the volumetric capacity thereof, and means for withdrawing fluid from said expansible bellows to collapse the same.

6. A container filling machine comprising a sealing cap for sealingly engaging a container presented thereto, expansible means suspended from said cap and adapted to extend into the container engaged by said cap, means for isolating a predetermined volume of fluid, a valve normally connecting the container with atmosphere and said expansible means with a source of vacuum, and means of operating said valve for communicating said container with the source of vacuum and for subsequently connecting the container with a source of filling liquid and communicating said expansible means with said fluid isolating means.

7. A container filling machine comprising a sealing cap for sealingly engaging a container presented thereto, a bellows suspended from said cap for expansion into the container, means for isolating a predetermined quantity of fluid, a valve normally connecting the container with atmosphere, said bellows with a source of vacuum and said isolating means with a source of fluid, means for turning said valve for connecting the container with the source of vacuum and then with a source of filling liquid while communicating said isolating means with said bellows, and means for forcing the fluid from said isolating means into said bellows for expanding the latter during influx of liquid into the container.

8. A container filling machine comprising sources of vacuum, filling liquid and fluid, a sealing cap for sealingly engaging a container presented thereto, means for providing a jacket around a container engaging said cap, a filling valve, a bellows suspended from said cap for expansion into the container, said valve normally communicating the container and jacket with atmosphere while connecting said bellows with the source of vacuum for retracting the same, means for receiving a predetermined charge of fluid for isolating the same relative to the source of fluid, and means for operating said valve for connecting the container first with the source of vacuum and then with the source of liquid, and said bellows with said isolating means for expanding said bellows during influx of liquid into the container.

9. A container filling machine comprising a container engaging seal, expansible means located within the confines of said seal for expansion into a container engaged by said seal, a valve having a first position connecting the container and said expansible means with a source of vacuum, and a second position connecting the container with a source of filling liquid and said expansible means with a source of fluid, and means operable when said valve is in said second position for applying a predetermined force against the fluid in said expansible means for expanding the latter into the container.

10. A container filling machine comprising sources of vacuum, fluid and filling liquid, a container engaging seal, expansible means located within the confines of said seal for expansion into a container engaged by said seal, a pump for isolating a predetermined quantity of fluid from said source, a filling valve, means for operating said valve in steps to first connect the container with the source of vacuum while connecting said pump with the source of liquid, and then connecting the container with the source of liquid while connecting said pump with said expansible means, then for re-connecting said expansible means with the source of vacuum, means for operating said pump during its connection with said expansible means for forcing the predetermined quantity of fluid from said pump into said expansible means to thereby expand the latter into the container for displacing a predetermined quantity of liquid irrespective of engagement of said expansible means by solid matter in the container.

11. Apparatus for filling a container comprising two separate sources of fluid, an impermeable fluid pressure expandable member, means for positioning a container with its open end adapted to receive said expandable member, conduit means for communicating the inside of said container with one of said sources of fluid and said expandable member with the other source of fluid, and valve means in said conduit means effective to simultaneously direct fluid into said container and into said expandable member.

12. A method of obtaining a headspace in a container during the container filling operation which comprises inserting an impermeable expansible member having a predetermined volume when expanded into the container, and simultaneously causing fluid to flow into said member to expand the same to said predetermined volume and directing filling liquid into the container.

13. A method of obtaining a headspace in a container during the container filling operation which comprises inserting an impermeable expandable member into the container, expanding said member to fill a predetermined volumetric portion of said container, directing a filling liquid into said container to fill that portion not occupied by the expanded member, collapsing said expanded member, and withdrawing said collapsed member from said container whereby a headspace of said predetermined volume will be obtained in said filled container.

14. A container filling machine comprising a sealing cap for sealingly engaging a container presented thereto, fluid pressure expansible means suspended from said cap and adapted to extend into the container engaged by said cap, said expansible means having a predetermined volume when expanded, a source of fluid, means for pressurizing said fluid, a valve normally connecting the container with atmosphere and said expansible means with a source of vacuum, and means of operating said valve for communicating said container with the source of vacuum and for subsequently connecting the container with a source of filling liquid and communicating said expansible means with said pressurized fluid to expand the same to its predetermined volume.

15. A container filling machine comprising a container engaging seal, fluid pressure expansible means located within the confines of said seal for expansion into a container engaged by said seal, a valve having a first position connecting the container and said expansible means with a source of vacuum, and a second position connecting the container with a source of filling liquid and said expansible means with a source of fluid, and means for pressurizing said fluid causing it to flow into said expansible means to expand the same when said valve is in said second position.

FRANK W. KRUEGER.

References Cited in the file of this patent

UNITED STATES PATENTS

| Number | Name | Date |
|---|---|---|
| 601,877 | Lochmann | Apr. 5, 1898 |
| 1,045,567 | Lanmark | Nov. 26, 1912 |
| 1,742,288 | Shields | Jan. 7, 1930 |
| 2,285,627 | Thompson | June 9, 1942 |
| 2,428,598 | Weaver | Oct. 7, 1947 |

FOREIGN PATENTS

| Number | Country | Date |
|---|---|---|
| 1,077 | Great Britain | Oct. 20, 1904 |
| 429,612 | Great Britain | July 3, 1935 |
| 611,144 | France | June 28, 1926 |